(12) United States Patent
Ziegler et al.

(10) Patent No.: US 6,296,797 B1
(45) Date of Patent: Oct. 2, 2001

(54) METHOD FOR PRODUCING COMPOSITE BODIES

(75) Inventors: Ursula Ziegler, Mainz; Klaus Kurz, Kelsterbach; Frank Reil, Gernsheim, all of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/509,599

(22) PCT Filed: Sep. 28, 1998

(86) PCT No.: PCT/EP98/06152

§ 371 Date: May 22, 2000

§ 102(e) Date: May 22, 2000

(87) PCT Pub. No.: WO99/16605

PCT Pub. Date: Apr. 8, 1999

(30) Foreign Application Priority Data

Sep. 30, 1997 (DE) .............................................. 197 43 134

(51) Int. Cl.[7] ..................................................... B28B 7/22
(52) U.S. Cl. ...................................... 264/255; 264/328.18
(58) Field of Search ............................. 524/542; 264/255, 264/328.18

(56) References Cited

U.S. PATENT DOCUMENTS

| | | | | |
|---|---|---|---|---|
| 4,261,473 | * | 4/1981 | Yamada | 215/1 |
| 4,443,507 | * | 4/1984 | Yamada | 428/114 |
| 4,957,677 | * | 9/1990 | Katoh | 264/135 |
| 5,912,315 | * | 6/1999 | Horiie | 528/71 |
| 5,977,266 | * | 11/1999 | Reil | 525/402 |
| 6,090,459 | * | 7/2000 | Jadamus | 428/36.4 |

* cited by examiner

*Primary Examiner*—Paul R. Michl
(74) *Attorney, Agent, or Firm*—Connolly Bove Lodge & Hutz LLP

(57) ABSTRACT

Process for producing a composite article from a polyacetal (component a) with directly molded-on functional elements made from one or more thermoplastic elastomers (component b), and wherein components a and b have differing hardness, and the material with the greater hardness (component a) is initially premolded in a first step in a mold, and then is either cooled and removed from the mold and then placed into another, larger cavity, or is partially removed from the mold, but remains in a portion of the mold, and is then moved to a larger cavity, or, without removal from the mold, remains in the same mold, which is enlarged by means of a movable device, and in a second step, by overmolding with the material with the lesser hardness (component b), the molding formed from component a is firmly bonded to this material and is then removed from the mold as a composite article.

14 Claims, No Drawings

METHOD FOR PRODUCING COMPOSITE BODIES

The invention relates to a process for producing polyacetal elastomer composite articles from a combination of the engineering material polyoxymethylene with directly molded-on functional elements made from one or more thermoplastic elastomers, and to the use of these.

The engineering material polyacetal, i.e. polyoxymethylene (POM) has excellent mechanical properties and is furthermore also generally resistant to all of the usual solvents and fuels. Moldings made from polyoxymethylene are therefore used inter alia in automotive construction, and in particular in fuel-conveying systems. Due to good strength and hardness combined with excellent resilience, moldings made from polyacetal are very often used in all areas of daily life for snap connections, in particular clips. Excellent sliding friction properties are the reason for the use of polyoxymethylene for many moving components, e.g. power train components, deflector rolls, gearwheels and adjusting levers. Very good mechanical durability and resistance to chemicals also allow housings and keyboards to be produced from polyoxymethylene.

However, POM has a low mechanical damping factor at room temperature. In some applications, this makes it necessary to use soft damping elements. In addition when moldings made from polyoxymethylene are incorporated a seal is often required at connecting points. The high surface hardness of moldings made from POM and the low sliding friction coefficient of POM can cause items placed thereon to slip and can limit the operating reliability of, for example, switching elements and control elements made from POM.

On the other hand, use is also increasingly often made of combinations of hard and soft materials, so as to combine the particular properties of these materials with one another. The hard material here is intended to give the components their strength, and the soft material, due to its elastic properties, assumes functions of sealing or insulation against vibration and noise or brings about a change in surface feel. In these applications it is important that there is sufficient adhesion between the hard and soft components.

Until now, gaskets and damping elements have sometimes been prepared separately and, usually in an additional operation, mechanically anchored or bonded, causing additional work and in some cases considerable added costs. A newer and more cost-effective method is multicomponent injection molding, in which, for example, a second component is overmolded onto a premolded first component. The adhesion achievable between the two components is very important for this process. Although in multicomponent injection molding this adhesion can often be further improved in physical interlocks by applying undercuts, good basic adhesion through chemical affinity between the selected components is often a necessary condition for their use.

Examples which are well known are multicomponent injection-molded combinations of polypropylene (PP) and polyolefin elastomers or styrene-olefin elastomers, and polybutylene terephthalate (PBT) with polyester elastomers or styrene-olefin elastomers. Polyamides, too, adhere to very many soft components.

There are also known moldings made from polyacetal with directly molded-on functional elements, which were produced using non-crosslinked rubbers (DE-C 44 39 766). However, bond strength in composite articles of this type is not yet satisfactory.

Another publication relates to composite articles of the same type which are composed, inter alia, of a polyacetal, a rubber copolymer, a reinforcing filler, a crosslinking agent and, if desired, other usual additives (DE-A 9611272). Particularly good adhesion of the polymer components is achieved by vulcanization of the rubber portion. However, this additional step is seen as a disadvantage, due to the increased temperatures and times for vulcanization.

It is also possible (DE-C 42 24 145) for the damping element of a locking ram of a motor vehicle door lock to be provided with areas of differing hardness and tensile strength. In such cases, a thermoplastic rubber is used first for the region of lower hardness, and for the region of greater hardness a polyacetal plastic is applied onto this. Although this procedure achieves good adhesion, this process is not very useful due to the low dimensional stability of the thermoplastic rubber.

Thermoplastic elastomers are claimed to be capable of combination with thermoplastics in the overmolding process. In this connection, polyurethane elastomers (TPE-U), for example, adhere to POM (Kunststoffe 84 (1994) p. 709). If, however, the soft component here is molded onto the hard component, as is generally the case, the result is only a few combinations having good ultimate tensile strength. This results from inadequate interdiffusion, since because of the temperature profile in this process diffusion is only very short-lived. The publication does not give any further details concerning the adhesion of the components mentioned. There are also no known relevant applications.

Finally, there is a known process, specifically profile extrusion, and a known apparatus for pre-vulcanization of thermoplastics and elastomers (DE-C 43 14 191). In this process chemical bonding is produced between the components, if desired with the addition of a coupling material. This process differs substantially from the above-mentioned multicomponent injection molding, due to the longer times of contact between the components. As is the case for the thermoplastic polymers, a wide variety of substances is also cited for the thermoplastics which can be used. including TPE-U and POM. The publication does not give any specific indication that precisely these substances are to be used together, nor does it indicate the advantages of such a combination.

It was an object of the present invention to provide a composite article made from polyacetal with directly molded-on functional elements made from thermoplastic elastomers by multicomponent injection molding, in which the limitations and disadvantages mentioned are not present.

This polyacetal elastomer composite article is composed of a) polyacetal and b) at least one thermoplastically processable elastomer, preferably TPE-U.

The invention provides a process for producing the above-mentioned polyacetal elastomer composite article as described in claim 1 in which the material with the greater hardness (component a)) is firstly premolded into the mold. The melt temperature here is in the usual range, i.e. in the range from about 180 to 240° C., preferably from 190 to 230° C., for the polyacetals described below. The mold itself is temperature-controlled in the range from 20 to 140° C. A mold temperature in the upper range of temperatures is advantageous for precise shaping and dimensional stability of the hard component part made from the partly crystalline material.

As soon as the charging of the part has been completed and the holding pressure is no longer acting (gate sealing point), then component a) may be finally cooled and then removed from the mold as the first part of the composite article (premolding). Then in a second and subsequent separate injection-molding step this premolding for example is placed or relocated into another mold with a recessed cavity and the material with the lower hardness (component b)) is injected into the mold and thereby molded onto component a) (insert or transform process). It is particularly advantageous here for the adhesion subsequently achievable if the premolded part made from the hard component a) is preheated in the range from 80° C. to just below the melting point to facilitate fusing-on of the second component b) and its penetration into the boundary layer.

The premolded part made from component a) may also be only partly removed from the mold and, together with a portion of the original mold (e.g. the feed plate, the ejector side or merely an indexing plate), be moved into another larger cavity.

Another way is to inject the second, softer component b) into the same mold without opening up the machine between the processes and without further transportation of the premolding made from component a). The mold cavities for the second, softer component b) have been initially closed off by movable inserts or cores during injection of the first, harder component a), and are not opened up until the second component b) is injected (sliding split-mold technique). This version of the process is also particularly advantageous for adhesion, since the melt of the soft material encounters the premolding while this is still hot, after only a short cooling time.

If desired, other components of type a) or b) may be molded on at the same time as injecting component b) in the second step or in further subsequent steps.

During molding on of component b), it is advantageous for good adhesion to have very high settings for the melt temperature, the injection rate and also the injection and holding pressure. The melt temperarture of component b) is generally in the range from 180 to 240° C., the upper limit being determined by its decomposition.

The maximum values for the injection rate and the injection and holding pressure are dependent on the machine and the molding, and have to be matched to the particular circumstances. In all versions of the process, with or without removal of the premolding from the mold, the mold is temperature-controlled in the second step in the range from 20 to 100° C. In this connection, the examples given show that mold temperatures in the upper range of temperature give better adhesion. However, depending on the design of the parts, it can be useful to lower the mold temperature somewhat, so as to optimize demoldability and cycle times.

After the parts have finished cooling, the multicomponent injection molding is removed from the mold. In this connection, an important factor in mold design is to place the ejectors at an appropriate point, so as to minimize any stress on the materials' bonded seam. The mold design should also provide sufficient venting of the cavity in the region of the seam, so as to minimize impairment of bonding between the two components resulting from air inclusion. The nature of any roughness of the mold wall has a similar effect. To develop good adhesion it is advantageous to have a smooth surface where the bonding seam is located, since in that case there is less air enclosed within the surface.

The tensile strength achieved by the novel process in the bond between component a) and component b) should be at least 0.5 N/mm$^2$ so as to ensure satisfactory handling. For functional parts, greater adhesion—depending on the loading—is desirable.

The component a) used in the composite article is a polyacetal, and specifically one selected from the class consisting of the known polyoxymethylenes (POMs), as described, for example, in DE-A 29 47 490. These are generally unbranched linear polymers which generally comprise at least 80 mol%, preferably at least 90 mol%, of oxymethylene (—$CH_2O$—) units. The term polyoxymethylene here includes both homopolymers of formaldehyde or of its cyclic oligomers, such as trioxane and tetroxane, and corresponding copolymers.

Homopolymers of formaldehyde or of trioxane are polymers whose hydroxyl end groups have been chemically stabilized in a known manner to prevent degradation, e.g. by esterification or etherification.

Copolymers are polymers made from formaldehyde or from its cyclic oligomers, in particular trioxane, and cyclic ethers, cyclic acetals and/or linear polyacetals.

Possible comonomers are 1) cyclic ethers having 3, 4 or 5 ring members, preferably 3 ring members, 2) cyclic acetals differing from trioxane and having from 5 to 11 ring members, preferably 5, 6, 7 or 8 ring members, and 3) linear polyacetals, in each case in amounts of from 0.1 to 20 mol%, preferably from 0.5 to 10 mol%.

The polyacetal polymers used generally have a melt index (MFR 190/2.16) of from 0.5 to 75 g/10 min (ISO 1133).

Preference is given to modified grades of POM, which give better adhesion with the softer component b). Examples of these modified grades are blends of POM with TPE-U (thermoplastic polyurethane elastomer), with MBS (methyl methacrylate-butadiene-styrene core-shell elastomer), with methyl methacrylate-acrylate core-shell elastomer, with PC (polycarbonate), with SAN (styrene-acrylonitrile copolymer) or with ASA (acrylate-styrene-acrylonitrile copolymer compound).

It has proven advantageous for component a) to have been modified with from 1 to 50% by weight of a thermoplastic polyurethane elastomer, with from 1 to 40% by weight of a methyl methacrylate-butadiene-styrene core-shell elastomer or a mixture of both, where the total of the proportions of both modifiers is in the range from 1 to 50% by weight.

The thermoplastically processable elastomers (component b) used are TPE-Us (thermoplastic polyurethane elastomers). These materials are multi-block copolymers which have built up from rigid urethane segments and flexible long-chain diol segments.

The rigid urethane segments here are obtained from a reaction between diisocyanates and chain extenders. The diisocyanates used may be aromatic, alicyclic or aliphatic diisocyanates. Preference is given here to diphenylmethane 4,4'-diisocyanate (MDI), tolylene diisocyanate (TDI), m-xylylene diisocyanate, p-xylylene diisocyanate, naphthylene diisocyanate, diphenyl diisocyanate, 4,4'-methylenebis(cyclohexyl isocyanate), isophorone diisocyanate and 1,6-hexamethylene diisocyanate. The chain extenders used are short-chain aliphatic, alicyclic or aromatic diols or diamines with a molar mass of less than 500 g/mol, preferably less than 300 g/mol, preferably those such as ethylene glycol, propylene 1,3-glycol, propylene 1,2-glycol, 1,4-butanediol, 1,5-pentanediol, 1,6-hexanediol, 1,4-cyclohexanediol, ethylenediamine, hexamethylene-diamine, xylylenediamine and 4,4'-diaminodiphenylmethane.

The flexible long-chain diol segments may be selected from the class consisting of polyetherdiols, polyesterdiols, polyetheresterdiols and polycarbonatediols with a number-average molar mass in the range from 500 to 5000 g/mol, preferably from 1000 to 3000 g/mol. The polyetherdiols may be prepared by ring-opening polymerization of cyclic $C_2$–$C_{12}$ ethers, such as ethylene oxide, propylene oxide or tetrahydrofuran. The polyesterdiols may be obtained by esterification reactions of dialcohols (examples of those preferably used here being ethylene glycol, propylene 1,3-glycol, propylene 1,2-glycol, 1,4-butanediol, 1,3-butanediol, 2-methylpropanediol, 1,5-pentanediol, 3-methyl-1,5-pentanediol, 1,6-hexanediol, neopentyl glycol, nonanediol, and 1,10-decanediol) and dicarboxylic acids (examples of those preferably used here being glutaric acid, adipic acid, pimelic acid, suberic acid, sebacic acid, terephthalic acid and isophthalic acid) or by corresponding transesterification reactions. It is also possible to obtain polyesterdiols of this type by ring-opening polymerization of lactones (examples of those preferably used here being caprolactone, propiolactone and valerolactone). The polycarbonates may be obtained by reacting dialcohols (examples of those preferably used here being ethylene glycol, propylene 1,3-glycol, propylene 1,2-glycol, 1,4-butanediol, 1,3-butanediol, 2-methylpropanediol, 1,5-pentanediol, 3-methyl-1,5-pentanediol, 1,6-hexanediol, neopentyl glycol, nonanediol and 1,10-decanediol) with diphenyl carbonate or phosgene.

Either polyesterurethane elastomers or polyetherurethane elastomers may be used for the composite articles described here. The hardness range of the products is from about Shore A 65 to about Shore D 75. The hardness here is also a measure of the proportion of rigid urethane segments to flexible long-chain diol segments. The melt index of the the products is measured at various temperatures, depending on the melting behavior of the rigid urethane segments. It is also a measure of the degree of addition (molar mass of the entire chains).

Components a) and b) may comprise conventional additives, such as stabilizers, nucleating agents, mold-release agents, lubricants, fillers and reinforcing materials, pigments, carbon black, light stabilizers, flame retardants, antistats, plasticizers or optical brighteners. The additives are present in the usual amounts. Examples of functional elements for the purposes of the present invention are sealing and/or damping elements, or else areas for improving anti-skid performance, such as grip recesses and the like.

The expression "directly molded on" is intended for the purposes of the present invention to mean that the functional elements are directly molded on in particular in a multicomponent injection molding process to the moldings made from polyacetal, with which they are intended to enter into a good adhesive bond.

Using the abovementioned elastomers, the sealing or damping elements can be directly molded onto moldings made from thermoplastic polymers, without the need for further stages of assembly. Dispensing with the processing steps hitherto required for assembling functional elements allows considerable cost saving to be achieved in the production of the novel composite articles.

The novel composite articles are used as connecting elements in the form of fittings, couplings, rollers, bearings, functional parts with integrated sealing and/or damping properties, and also as elements which are non-slip and easy-grip. These include housings in automotive construction, such as door closure housings, window lifter housings, sliding roof sealing elements and the like, and also fastening elements with an integrated seal, such as clips with sealing rings or with sealing disks, decorative strips with an integrated sealing lip, sealing elements for compensation in expansion joints, sealing elements with good damping properties, e.g. clips with centers for damping vibration or noise, power train components, such as gearwheels with damping elements, gearboxes with integrated flexible couplings, non-slip, easy-grip elements, such as control levers or control knobs, or grip surfaces on electrical devices or on writing implements, and also chain links with a resilient surface.

Since there was no existing measurement procedure for the bond strength between the hard polyacetal component and the soft, thermoplastically processable elastomer component of the composite article according to the invention, suitable measurement procedures were developed under pilot plant conditions. These procedures are intended to indicate results achievable under industrial conditions.

Measurement procedure I

The injection molding machine used for the injection molding experiments (type KM 90-210 B, manufacturer Krauss-Maffei, Munich, Germany) had a locking force of 900 kN and screw diameter of 30 mm. ISO tensile specimens of dimensions in accordance with ISO 3167 were firstly premolded from material 1. For the polyacetal grades used, the melt temperature was 200° C. and the mold temperature 80° C. (When the TPE-U grades were used as material 1 for the examples with reversed injection-molding sequence in Table 5 b) the melt temperature was 200° C. and the mold temperature 30° C.). The resultant ISO tensile specimens were sawn through in the middle, giving two halved specimens each with a shoulder.

The resultant halved tensile specimens made from polyacetal were preheated in a circulating-air heating cabinet at various temperatures $T_{ins}$ (from 50 to 140° C.) and placed while still hot, within about 20 sec, into the fully open tensile specimen mold. (The halved specimens made from TPE-U for the examples with reversed injection-molding sequence in Table 5 b) were not preheated but placed at room temperature into the mold). In a second injection-molding operation, material 2 was injected into the tensile specimen mold at various melt temperatures $T_{me}$ (from 200 to 220° C.) and mold temperatures $T_{mo}$ (from 30 to 80° C.) at an injection rate $v_i$ of from 300 to 400 mm/sec. The holding pressure $P_a$ was varied (from 60 to 120 bar) with a holding pressure time of 30 sec.

Measurement procedure II

A three-component injection-molding machine (type FM 175/200, manufacturer Klöckner-Ferromatik, Malterdingen, Germany) was used for the injection-molding experiments and had a locking force of 2000 kN. Of the three screws available, a unit with 45 mm diameter was used. Modified ISO tensile specimens with one shoulder were firstly premolded from material 1 in a cavity closed on one side. For the polyacetal types used, the melt temperature was 200° C. and the mold temperature 80° C.

The resultant halved tensile specimens made from polyacetal were preheated in a circulating-air heating cabinet at a temperature $T_{ins}$ of 155° C. and placed while still hot, within about 20 sec, into the fully open tensile specimen mold. In a second injection-molding operation, material 2 was injected into the tensile specimen mold at various melt temperatures $T_{me}$ (from 200 to 225° C.) and mold temperatures Tmo (from 30 to 80° C.) at an injection rate of 600 mm/sec. The holding pressure was 80 bar with a holding pressure time of 30 sec.

Measurement procedure III

A three-component injection-molding machine (type FM 175/200, manufacturer Klöckner-Ferromatik, Malterdingen, Germany) was used for the injection-molding experiments and had a locking force of 2000 kN. Of the three screws available, a unit with diameter 45 mm was used for component a (polyacetal) and one with diameter 30 mm for component b (TPE-U). The two melt streams were injected directly onto one another simultaneously from two sides into a mold for the ISO tensile specimen, in such a way that they met head-on in the middle of the tensile specimen. The settings here were held constant in the polyacetal unit (melt temperature 200° C., injection rate 600 mm/sec and holding pressure 80 bar for 30 sec). Component b (TPE-U) was injected at various melt temperatures $T_{me}$ (from 200 to 220° C.) at an injection rate of 225 mm/sec and a holding pressure $P_a$ of from 50 to 80 bar, with a holding pressure time of 30 sec. The mold temperature $T_{mo}$ was from 30 to 55° C.

The three procedures described gave a complete tensile specimen with adequate adhesion and with a bonded seam between the two half specimens made from the two materials. These test specimens were tensile-tested (ISO 527) on a type 1455 (Zwick, Ulm, Germany) tensile test machine with a test speed of 50 mm/sec. For each example, 10 composite tensile specimens were molded and tested. The result of the tensile test (stress/strain) was used to determine the ultimate tensile strength of the specimens at the bonded seam (bond strength). A mean value and the associated standard deviation were calculated from the values obtained for the 10 test specimens. The results are listed in the tables.

EXAMPLES

Component a) (Polyacetal)

A1: (POM MFI 9)
Polyoxymethylene copolymer made from trioxane and about 2% by weight of ethylene oxide, melt index MFR 190/2.16 (ISO 1133): 9 g/10 min, modification : none A2: (POM MFI 27)
Polyoxymethylene copolymer made from trioxane and about 2% by weight of ethylene oxide, melt index MFR 190/2.16 (ISO 1133): 27 g/10 min, modification: none A3: (POM MFI 9+10% of TPE-U)
Polyoxymethylene copolymer made from trioxane and about 2% by weight of ethylene oxide, melt index MFR 190/2.16 (ISO 1133): 9 g/10 min, modification: 10% by weight of TPE-U of composition as in B3

A4: (POM MFI 9+20% of TPE-U)
Polyoxymethylene copolymer made from trioxane and about 2% by weight of ethylene oxide, melt index MFR 190/2.16 (ISO 1133): 9 g/10 min, modification : 20% by weight of TPE-U of composition as in B3

A5: (POM MFI 27+5% by weight of TPE-U)
Polyoxymethylene copolymer made from trioxane and about 2% by weight of ethylene oxide, melt index MFR 190/2.16 (ISO 1133): 27 g/10 min, modification : 5% by weight of TPE-U of composition as in B3

A6: (POM MFI 27+10% by weight of TPE-U)
Polyoxymethylene copolymer made from trioxane and about 2% by weight of ethylene oxide, melt index MFR 190/2.16 (ISO 1133): 27 g/10 min, modification: 10% by weight of TPE-U of composition as in B3

A7: (POM MFI 27+20% by weight of TPE-U)
Polyoxymethylene copolymer made from trioxane and about 2% by weight of ethylene oxide, melt index MFR 190/2.16 (ISO 1133): 27 g/10 min, modification: 20% by weight of TPE-U of composition as in B3

A8: (POM MFI 27+30% by weight of TPE-U)
Polyoxymethylene copolymer made from trioxane and about 2% by weight of ethylene oxide, melt index MFR 190/2.16 (ISO 1133): 27 g/10 min, modification : 30% by weight of TPE-U of composition as in B3

A9: (POM MFI 27+40% by weight of TPE-U)
Polyoxymethylene copolymer made from trioxane and about 2% by weight of ethylene oxide, melt index MFR 190/2.16 (ISO 1133): 27 g/10 min, modification: 40% by weight of TPE-U of composition as in B3

A10: (POM MFI 27+10% of aliphat. of TPE-U)
Polyoxymethylene copolymer made from trioxane and about 2% by weight of ethylene oxide, melt index MFR 190/2.16 (ISO 1133): 27 g/10 min, modification: 10% by weight of aliphat. polyester TPE-U made from hexamethylene diisocyanate, adipic acid, ethylene glycol, 1,4-butanediol, neopentyl glycol and 1,6-hexanediol, Shore hardness A 72, density 1.14 g/cm$^3$ A11: (POM MFI 9+13% of MBS)
Polyoxymethylene copolymer made from trioxane and about 2% by weight of ethylene oxide, melt index MFR 190/2.16 (ISO 1133): 9 g/10 min, modification: 13% by weight of MBS core-shell modifier made from about 80% by weight of flexible polybutadiene core and 20% by weight of MMA-styrene shell with a particle size of about 100 nm A12: (POM MFI 9+25% of MBS)
Polyoxymethylene copolymer made from trioxane and about 2% by weight of ethylene oxide, melt index MFR 190/2.16 (ISO 1133): 9 g/10 min, modification: 25% by weight of MBS core-shell modifier made from about 80% by weight of flexible polybutadiene core and 20% by weight of MMA-styrene shell with a particle size of about 100 nm A13: (POM MFI 13, low comonomer content)
Polyoxymethylene copolymer made from trioxane and about 0.7% by weight of ethyleneoxide, melt index MFR 190/2.16 (ISO 1133): 13 g/10 min, modification: none A14: (®Delrin 8511, DuPont, Geneva, Switzerland)
Polyoxymethylene homopolymer made from formaldehyde, melt index MFR 190/2.16 (ISO 1133): 14 g/10 min, commercially available stabilizer and mold-release agent A15: (®Ultraform N 2320, BASF AG, Ludwigshafen, Germany)
Polyoxymethylene copolymer made from trioxane and about 2.7% by weight of butanediol formal, melt index MFR 190/2.16 (ISO 1133): 9 g/10 min, commercially available stabilizer and mold-release agent A16: (POM MFI 27+10% of aliphat. TPE-U+10% of glass fiber)
Polyoxymethylene copolymer made from trioxane and about 2% by weight of ethylene oxide, melt index MFR 190/2.16 (ISO 1133): 27 g/10 min, modification: 10% by weight of aliphat. polyester TPE-U made from hexamethylene diisocyanate, adipic acid, ethylene glycol, 1,4-butanediol, neopentyl glycol and 1,6-hexanediol, Shore hardness A 72, density 1.14 g/cm$^3$; 10% by weight of EMF 1691 short glass fiber Component b) (Thermoplastic Polyurethane Elastomer, TPE-U)

All TPE-U materials were predried before processing for 6 hours at 80° C. under circulating air, since moisture impairs the processibility of the TPE-U and the adhesion.

B1:
partially aromatic polyester TPE-U made from diphenylmethane 4,4'-diisocyanate (MDI), 1,4-butanediol as chain extender and polyesterdiol made from adipic acid and 1,4-butanediol, Shore hardness A 83, density 1.20 g/cm$^3$; MVR 210/2.16 (ISO 1133): 6 cm/10 min mold-release agent: none B2:
partially aromatic polyester TPE-U made from diphenylmethane 4,4'-diisocyanate (MDI), 1,4-butanediol as chain extender, and a copolyesterdiol made from adipic acid, ethylene glycol and 1,4-butanediol, Shore hardness A 80, density 1.22 g/cm$^3$; MVR 210/2.16 (ISO 1133): 7 cm/10 min, MVR 230/2,16 (ISO 1133): 109 cm$^2$/10 min mold-release agent: none B3:
   partially aromatic polyester TPE-U made from diphenylmethane 4,4'-diisocyanate (MDI), 1,4-butanediol as chain extender, and a copolyesterdiol made from adipic acid, ethylene glycol and 1,4-butanediol, Shore hardness A 80, density 1.22 g/cm$^3$; MVR 210/2.16 (ISO 1133): 7 cm/10 min mold-release agent: 0.5% by weight of ethylenebisstearamide B4:
   partially aromatic polyester TPE-U made from diphenylmethane 4,4'-diisocyanate (MDI), 1,4-butanediol as chain extender, and a copolyesterdiol made from adipic acid, ethylene glycol and 1,4-butanediol, Shore hardness A 84, density 1.22 g/cm$^3$; MVR 210/2.16 (ISO 1133): 14 cm/10 min mold-release agent: none B5:
   partially aromatic polyester TPE-U made from diphenylmethane 4,4'-diisocyanate (MDI), 1,4-butanediol as chain extender, and a copolyesterdiol made from adipic acid, 1,6-hexanediol and 1,4-butanediol, Shore hardness A 80, density 1.18 g/cm$^3$; MVR 210/2.16 (ISO 1133): 7 cm/10 min mold-release agent: none B6:
   partially aromatic polyester TPE-U made from diphenylmethane 4,4'-diisocyanate (MDI), 1,4-butanediol as chain extender, and a polyetherdiol made from polytetrahydrofuran, Shore hardness A 80, density 1.22 g/cm$^3$; MYR 210/2.16 (ISO 1133): 13 cm/10 min mold-release agent: none B7:
   partially aromatic polyester TPE-U made from diphenylmethane 4,4'-diisocyanate (MDI), 1,4-butanediol as chain extender, and a copolyesterdiol made from adipic acid, ethylene glycol and 1,4-butanediol, Shore hardness A 92, D 41, density 1.23 g/cm$^3$; MVR 210/2.16 (ISO 1133): 90 cm/10 min mold-release agent: none B8:
   partially aromatic polyester TPE-U made from diphenylmethane 4,4'-diisocyanate (MDI), 1,4-butanediol as chain extender, and a copolyesterdiol made from adipic acid, ethylene glycol and 1,4-butanediol, Shore hardness A 98, D 53, density 1.25 g/cm$^3$; MVR 210/2.16 (ISO 1133) : 97 cm/10 min mold-release agent: none B9:
   partially aromatic polyester TPE-U made from diphenylmethane 4,4'-diisocyanate (MDI), 1,4-butanediol as chain extender, and a copolyesterdiol made from adipic acid, ethylene glycol and 1,4-butanediol, Shore hardness D 64, density 1.26 g/cm$^3$; MVR 230/2.16 (ISO 1133): 83 cm/10 min mold-release agent: none Tables Table 1 shows the influence of insertion temperature in the range from 50 to 140° C. The bond strength rises significantly at higher insertion temperatures.

Table 2 shows the influence of the mold temperature in the range from 30 to 80° C. Bond strength rises significantly at higher mold temperatures.

Table 3 shows the influence of holding pressure in the range from 80 to 120 bar. Bond strength rises slightly at higher holding pressures.

Table 4 shows the influence of the injection rate in the range from 300 to 400 mm/sec. Within the range investigated the injection rate has little influence on bond strength.

Tables 5a and 5b show the influence of the injection-molding sequence with identical combinations of materials. In the examples in Table 5 a) the hard component a) was premolded and the soft component b) was molded onto the hard component in the second step. In contrast, in Table 5 b) the soft component b) was premolded and the hard component a) was molded onto the soft component. For all of the combinations, bond strengths are significantly higher when the hard component is molded onto the soft component. However, this process cannot usually be used because the soft component lacks dimensional stability and the dimensions of moldings of flexible gaskets in industry are frequently small.

Tables 6a and 6b show the influence of modification of the polyacetal by admixing differing proportions of TPE-U. In all of the examples investigated, bond strength increases signficantly with rising TPE-U content.

Table 7 shows the influence of modification of the polyacetal by admixing differing proportions of MBS core-shell rubber. In the examples investigated, bond strength increases significantly with rising MBS content.

Table 8 shows the influence of comonomer content and comonomer type in the polyacetal. Bond strength increases significantly with rising comonomer content.

Table 9 shows the influence of small amounts of mold-release agents in the TPE-U (B3 compared with B2). No negative effect is discernible in these examples. This is important industrially, since addition of mold-release agent can improve the processability of the TPE-U. The viscosity of the TPE-U grade (B4 compared with B2) also showed no effect in these examples. This is important industrially for achieving reproducible bond strengths even when the flowability of the TPE-U varies.

Table 10 compares TPE-U grades of similar hardness but differing chemical structure of the flexible segments. In these examples the best adhesion is achieved with a structure as in B1 (soft segment of pure butanediol adipate). However, good adhesion can also be achieved with other polyester grades or else polyether grades (B6). This is frequently important industrially, since, for example, mixed esters can suppress the crystallization of the soft segments and thus ensure better cold flexibility or, for example, polyethers have better resistance to hydrolysis.

Table 11 compares TPE-U grades with similar chemical structure but differing hardness. Bond strength increases with increasing hardness of the soft component. However, in industry it is frequently necessary for the soft component used to have very low hardness, so as to ensure the best possible sealing and damping function.

Table 12 shows the influence of the test procedure on the results for bond strength. In the insertion procedure (Procedure I) the strengths achieved are markedly lower than when the melts meet one another directly (Procedure III). In the sliding split-mold technique, particularly suitable for industrial purposes, the conditions for temperature and time are in the region between these two test procedures used.

TABLE 1

Influence of insertion temperature $T_{ins}$
(Production of test specimens by Procedure I)

| Material 1 | Material 2 | B 1 | B 1 | B 1 | B 1 |
|---|---|---|---|---|---|
| | $T_{me}$ [° C.] | 200 | 200 | 200 | 200 |
| | $T_{mo}$ [° C.] | 30 | 30 | 30 | 30 |
| | $T_{ins}$ [° C.] | 50 | 80 | 110 | 140 |

TABLE 1-continued

Influence of insertion temperature $T_{ins}$
(Production of test specimens by Procedure I)

| Material 1 | Material 2 | B 1 | B 1 | B 1 | B 1 |
|---|---|---|---|---|---|
| | $p_a$ [bar] | 80 | 80 | 80 | 80 |
| | $v_i$ [mm/sec] | 400 | 400 | 400 | 400 |
| A 4 | bond strength [N/mm²] ± std. dev. | no adhesion | no adhesion | 1.3 ± 0.5 | 2.4 ± 0.9 |
| A 10 | bond strength [N/mm²] ± std. dev. | no adhesion | no adhesion | 1.0 ± 0.5 | 1.8 ± 0.8 |

TABLE 2

Influence of mold temperature $T_{mo}$
(Production of test specimens by Procedure I)

| Material 1 | Material 2 | B 1 | B 1 | B 1 |
|---|---|---|---|---|
| | $T_{me}$ [° C.] | 200 | 200 | 200 |
| | $T_{mo}$ [° C.] | 30 | 50 | 80 |
| | $T_{ins}$ [° C.] | 140 | 140 | 140 |
| | $p_a$ [bar] | 80 | 80 | 80 |
| | $v_i$ [mm/sec] | 400 | 400 | 400 |
| A 2 | bond strength [N/mm²] ± std. dev. | no adhesion | 1.8 ± 1.0 | 3.2 ± 0.9 |
| A 6 | bond strength [N/mm²] ± std. dev. | 2.3 ± 0.5 | 2.8 ± 0.7 | 3.6 ± 0.4 |
| A 3 | bond strength [N/mm²] ± std. dev. | 1.1 ± 0.4 | 2.8 ± 0.9 | 3.5 ± 0.7 |

TABLE 3

Influence of holding pressure $p_a$
(Production of test specimens by Procedure I)

| Material 1 | Material 2 | B 1 | B 1 |
|---|---|---|---|
| | $T_{me}$ [° C.] | 220 | 200 |
| | $T_{mo}$ [° C.] | 30 | 30 |
| | $T_{ins}$ [° C.] | 140 | 140 |
| | $p_a$ [bar] | 80 | 120 |
| | $v_i$ [mm/sec] | 400 | 400 |
| A 2 | bond strength [N/mm²] ± std. dev. | no adhesion | 1.3 ± 0.6 |
| A 6 | bond strength [N/mm²] ± std. dev. | 2.3 ± 0.5 | 2.6 ± 0.3 |
| A 7 | bond strength [N/mm²] ± std. dev. | 2.6 ± 0.5 | 2.8 ± 0.5 |
| A 3 | bond strength [N/mm²] ± std. dev. | 1.5 ± 0.5 | 1.6 ± 0.4 |
| A 4 | bond strength [N/mm²] ± std. dev. | 2.2 ± 0.4 | 2.4 ± 0.5 |
| A 12 | bond strength [N/mm²] ± std. dev. | 1.3 ± 0.4 | 1.6 ± 0.6 |

TABLE 4

Influence of injection rate $v_i$
(Production of test specimens by Procedure I)

| Material 1 | Material 2 | B 1 | B 1 |
|---|---|---|---|
| | $T_{me}$ [° C.] | 200 | 200 |
| | $T_{mo}$ [° C.] | 30 | 30 |
| | $T_{ins}$ [° C.] | 140 | 140 |
| | $p_a$ [bar] | 80 | 80 |
| | $v_i$ [mm/sec] | 300 | 400 |
| A 2 | bond strength [N/mm²] ± std. dev. | no adhesion | no adhesion |
| A 6 | bond strength [N/mm²] ± std. dev. | 2.1 ± 1.0 | 2.3 ± 0.5 |
| A 7 | bond strength [N/mm²] ± std. dev. | 2.1 ± 1.1 | 2.3 ± 0.7 |
| A 3 | bond strength [N/mm²] ± std. dev. | 1.2 ± 0.7 | 1.1 ± 0.4 |
| A 4 | bond strength [N/mm²] ± std. dev. | 2.6 ± 0.5 | 2.4 ± 0.9 |
| A 12 | bond strength [N/mm²] ± std. dev. | 1.7 ± 0.7 | 2.1 ± 0.6 |

TABLE 5a

Influence of injection-molding sequence (material sequence)
a) soft onto hard
(Production of test specimens by Procedure I)

| Material 1 | Material 2 | B 4 | B 1 | B 3 |
|---|---|---|---|---|
| | $T_{me}$ [° C.] | 200 | 200 | 200 |
| | $T_{mo}$ [° C.] | 30 | 30 | 30 |
| | $T_{ins}$ [° C.] | 140 | 140 | 140 |
| | $p_a$ [bar] | 80 | 80 | 80 |
| | $v_i$ [mm/sec] | 400 | 400 | 400 |
| A 1 | bond strength [N/mm²] ± std. dev. | 0.9 ± 0.2 | no adhesion | no adhesion |
| A 3 | bond strength [N/mm²] ± std. dev. | 1.3 ± 0.4 | 1.1 ± 0.4 | 2.0 ± 0.6 |
| A 4 | bond strength [N/mm²] ± std. dev. | 2.0 ± 0.4 | 2.4 ± 0.9 | 2.4 ± 0.9 |
| A 11 | bond strength [N/mm²] ± std. dev. | 1.6 ± 0.3 | 1.4 ± 0.7 | 1.1 ± 0.6 |
| A 12 | bond strength [N/mm²] ± std. dev. | 2.0 ± 0.4 | 2.1 ± 0.6 | 1.7 ± 0.9 |

TABLE 5b

Influence of injection-molding sequence (material sequence)
b) hard onto soft
(Production of test specimens by Procedure I)

| Material 1 | Material 2 | A 1 | A 3 | A 4 | A 11 | A 12 |
|---|---|---|---|---|---|---|
| | $T_{me}$ [° C.] | 200 | 200 | 200 | 200 | 200 |
| | $T_{mo}$ [° C.] | 80 | 80 | 80 | 80 | 80 |
| | $T_{ins}$ [° C.] | 23 | 23 | 23 | 23 | 23 |
| | $p_a$ [bar] | 80 | 80 | 80 | 80 | 80 |
| | $v_i$ [mm/sec] | 400 | 400 | 400 | 400 | 400 |

TABLE 5b-continued

Influence of injection-molding sequence (material sequence)
b) hard onto soft
(Production of test specimens by Procedure I)

| Material 1 | Material 2 | A 1 | A 3 | A 4 | A 11 | A 12 |
|---|---|---|---|---|---|---|
| B 4 | bond strength [N/mm$^2$] ± std. dev. | 1.6 ± 0.5 | 1.9 ± 0.6 | 1.8 ± 0.4 | 2.3 ± 0.5 | 2.7 ± 0.5 |
| B 1 | bond strength [N/mm$^2$] ± std. dev. | 3.9 ± 0.4 | 4.4 ± 0.9 | 4.0 ± 0.6 | 4.0 ± 1.0 | 4.2 ± 0.6 |
| B 3 | bond strength [N/mm$^2$] ± std. dev. | 2.1 ± 0.4 | 2.1 ± 0.6 | 1.9 ± 0.6 | 2.1 ± 0.7 | 2.4 ± 0.4 |

TABLE 6a

Influence of TPE-U content in the POM
(Production of test specimens by Procedure I)

| Material 1 | Material 2 | B 4 |
|---|---|---|
|  | $T_{me}$ [° C.] | 200 |
|  | $T_{mo}$ [° C.] | 30 |
|  | $T_{ins}$ [° C.] | 140 |
|  | $p_a$ [bar] | 80 |
|  | $v_i$ [mm/sec] | 400 |
| A 1 | bond strength [N/mm$^2$] ± std. dev. | 0.9 ± 0.2 |
| A 3 | bond strength [N/mm$^2$] ± std. dev. | 1.3 ± 0.4 |
| A 4 | bond strength [N/mm$^2$] ± std. dev. | 2.0 ± 0.4 |
| A 2 | bond strength [N/mm$^2$] ± std. dev. | 0.7 ± 0.4 |
| A 6 | bond strength [N/mm$^2$] ± std. dev. | 1.3 ± 0.4 |
| A 7 | bond strength [N/mm$^2$] ± std. dev. | 2.1 ± 0.3 |

TABLE 6b

Influence of TPE-U content in the POM
(Production of test specimens by Procedure II)

| Material 1 | Material 2 | B 2 | B 1 |
|---|---|---|---|
|  | $T_{me}$ [° C.] | 200 | 200 |
|  | $T_{mo}$ [° C.] | 55 | 80 |
|  | $T_{ins}$ [° C.] | 155 | 155 |
|  | $p_a$ [bar] | 80 | 80 |
|  | $v_i$ [mm/sec] | 600 | 600 |
| A 2 | bond strength [N/mm$^2$] ± std. dev. | 1.2 ± 0.4 | 0.8 ± 0.4 |
| A 5 | bond strength [N/mm$^2$] ± std. dev. | 2.1 ± 0.5 | 2.4 ± 0.9 |
| A 6 | bond strength [N/mm$^2$] ± std. dev. | 2.2 ± 0.5 | 2.9 ± 0.5 |
| A 7 | bond strength [N/mm$^2$] ± std. dev. | 2.4 ± 0.4 | 3.3 ± 0.6 |
| A 8 | bond strength [N/mm$^2$] ± std. dev. | 2.4 ± 0.8 | 3.5 ± 0.6 |
| A 9 | bond strength [N/mm$^2$] ± std. dev. | 2.8 ± 0.3 | 3.9 ± 0.4 |

TABLE 7

Influence of MBS content in the POM
(Production of test specimens by Procedure I)

| Material 1 | Material 2 | B 4 |
|---|---|---|
|  | $T_{me}$ [° C.] | 200 |
|  | $T_{mo}$ [° C.] | 30 |
|  | $T_{ins}$ [° C.] | 140 |
|  | $p_a$ [bar] | 80 |
|  | $v_i$ [mm/sec] | 400 |
| A 1 | bond strength [N/mm$^2$] ± std. dev. | 0.9 ± 0.2 |
| A 11 | bond strength [N/mm$^2$] ± std. dev. | 1.6 ± 0.3 |
| A 12 | bond strength [N/mm$^2$] ± std. dev. | 2.0 ± 0.4 |

TABLE 8

Influence of comonomer content and comonomer type in the POM
(Production of test specimens by Procedure II)

| Material 1 | Material 2 | B 2 |
|---|---|---|
|  | $T_{me}$ [° C.] | 200 |
|  | $T_{mo}$ [° C.] | 80 |
|  | $T_{ins}$ [° C.] | 155 |
|  | $p_a$ [bar] | 80 |
|  | $v_i$ [mm/sec] | 600 |
| A 14 | bond strength [N/mm$^2$] ± std. dev. | 1.2 ± 0.4 |
| A 13 | bond strength [N/mm$^2$] ± std. dev. | 1.5 ± 0.3 |
| A 1 | bond strength [N/mm$^2$] ± std. dev. | 1.8 ± 0.4 |
| A 15 | bond strength [N/mm$^2$] ± std. dev. | 2.2 ± 0.3 |

TABLE 9

Influence of mold-release agent and of TPE-U viscosity
(Production of test specimens by Procedure I)

| Material 1 | Material 2 | B 2 | B 4 | B 3 |
|---|---|---|---|---|
|  | $T_{me}$ [° C.] | 200 | 200 | 200 |
|  | $T_{mo}$ [° C.] | 30 | 30 | 30 |
|  | $T_{ins}$ [° C.] | 140 | 140 | 140 |
|  | $p_a$ [bar] | 80 | 80 | 80 |
|  | $v_i$ [mm/sec] | 400 | 400 | 400 |
| A 2 | bond strength [N/mm$^2$] ± std. dev. | 0.6 ± 0.3 | 0.7 ± 0.4 | 0.7 ± 0.3 |
| A 6 | bond strength [N/mm$^2$] ± std. dev. | 1.4 ± 0.5 | 1.3 ± 0.4 | 1.2 ± 0.2 |
| A 7 | bond strength [N/mm$^2$] ± std. dev. | 2.0 ± 0.4 | 2.1 ± 0.3 | 1.7 ± 0.4 |
| A 16 | bond strength [N/mm$^2$] ± std. dev. | 1.5 ± 0.6 | 1.3 ± 0.2 | 1.4 ± 0.4 |

TABLE 10

Influence of TPE-U chemical structure
(Production of test specimens by Procedure I)

| Material 1 | Material 2 | | B 1 | B 2 | B 5 | B 6 |
|---|---|---|---|---|---|---|
| | $T_{me}$ [° C.] | | 200 | 200 | 200 | 200 |
| | $T_{mo}$ [° C.] | | 30 | 30 | 30 | 30 |
| | $T_{ins}$ [° C.] | | 140 | 140 | 140 | 140 |
| | $p_a$ [bar] | | 80 | 80 | 80 | 80 |
| | $v_i$ [mm/sec] | | 400 | 400 | 400 | 400 |
| A 2 | bond strength [N/mm$^2$] ± std. dev. | | no adhesion | 0.6 ± 0.3 | 0.6 ± 0.2 | 0.5 ± 0.5 |
| A 6 | bond strength [N/mm$^2$] ± std. dev. | | 2.3 ± 0.5 | 1.4 ± 0.5 | 1.6 ± 0.6 | 1.2 ± 0.5 |
| A 7 | bond strength [N/mm$^2$] ± std. dev. | | 2.3 ± 0.7 | 2.0 ± 0.4 | 1.8 ± 0.5 | 1.4 ± 0.4 |
| A 16 | bond strength [N/mm$^2$] ± std. dev. | | 2.5 ± 0.4 | 1.5 ± 0.6 | 1.8 ± 0.5 | 1.5 ± 0.4 |

TABLE 11a

Influence of TPE-U hardness
(Production of test specimens by Procedure I)

| Material 1 | Material 2 | B 2 | B 8 | B 9 |
|---|---|---|---|---|
| | $T_{me}$ [° C.] | 200 | 200 | 220 |
| | $T_{mo}$ [° C.] | 30 | 30 | 30 |
| | $T_{ins}$ [° C.] | 140 | 140 | 140 |
| | $p_a$ [bar] | 80 | 80 | 80 |
| | $v_i$ [mm/sec] | 400 | 400 | 400 |
| A 2 | bond strength [N/mm$^2$] ± std. dev. | 0.6 ± 0.3 | 1.9 ± 0.3 | — |
| A 6 | bond strength [N/mm$^2$] ± std. dev. | 1.4 ± 0.5 | 2.6 ± 0.8 | 2.8 ± 1.0 |
| A 7 | bond strength [N/mm$^2$] ± std. dev. | 2.0 ± 0.4 | 2.4 ± 0.7 | 3.1 ± 0.4 |
| A 16 | bond strength [N/mm$^2$] ± std. dev. | 1.5 ± 0.6 | 2.0 ± 0.7 | 2.4 ± 1.8 |

TABLE 11b

Influence of TPE-U hardness
(Production of test specimens by Procedure II)

| Material 1 | Material 2 | B 2 | B 7 | B 9 |
|---|---|---|---|---|
| | $T_{me}$ [° C.] | 200 | 215 | 225 |
| | $T_{mo}$ [° C.] | 80 | 80 | 80 |
| | $T_{ins}$ [° C.] | 155 | 155 | 155 |
| | $p_a$ [bar] | 80 | 80 | 80 |
| | $v_i$ [mm/sec] | 600 | 600 | 600 |
| A 7 | bond strength [N/mm$^2$] ± std. dev. | 2.5 ± 0.5 | 3.8 ± 1.0 | 6.4 ± 0.8 |

TABLE 12

Influence of procedure

| | | Procedure I | Procedure III |
|---|---|---|---|
| | $T_{me}$ [° C.] | 200 | 200 |
| | $T_{mo}$ [° C.] | 50 | 55 |
| | $T_{ins}$ [° C.] | 140 | — |
| | $p_a$ [bar] | 80 | 80 |
| | $v_i$ [mm/sec] | 400 | 225 |
| Material 1 = A 6 Material 2 = B 1 | bond strength [N/mm$^2$] ± std. dev. | 2.8 ± 0.7 | 3.6 ± 0.2 |
| | $T_{me}$ [° C.] | 200 | 200 |
| | $T_{mo}$ [° C.] | 30 | 30 |
| | $T_{ins}$ [° C.] | 140 | — |
| | $p_a$ [bar] | 80 | 50 |
| | $v_i$ [mm/sec] | 400 | 225 |
| Material 1 = A 6 Material 2 = B 2 | bond strength [N/mm$^2$] ± std. dev. | 1.4 ± 0.5 | 2.6 ± 0.2 |
| | $T_{me}$ [° C.] | 200 | 200 |
| | $T_{mo}$ [° C.] | 30 | 55 |
| | $T_{ins}$ [° C.] | 140 | — |
| | $p_a$ [bar] | 80 | 80 |
| | $v_i$ [mm/sec] | 400 | 225 |
| Material 1 = A 6 Material 2 = B 5 | bond strength [N/mm$^2$] ± std. dev. | 1.6 ± 0.6 | 3.2 ± 0.4 |
| | $T_{me}$ [° C.] | 200 | 190 |
| | $T_{mo}$ [° C.] | 50 | 30 |
| | $T_{ins}$ [° C.] | 140 | — |
| | $p_a$ [bar] | 80 | 80 |
| | $v_i$ [mm/sec] | 400 | 225 |
| Material 1 = A 6 Material 2 = B 6 | bond strength [N/mm$^2$] ± std. dev. | 1.2 ± 0.5 | 3.8 ± 0.2 |
| | $T_{me}$ [° C.] | 220 | 220 |
| | $T_{mo}$ [° C.] | 50 | 55 |
| | $T_{ins}$ [° C.] | 140 | — |
| | $p_a$ [bar] | 80 | 80 |
| | $v_i$ [mm/sec] | 400 | 225 |
| Material 1 = A 6 Material 2 = B 9 | bond strength [N/mm$^2$] ± std. dev. | 2.8 ± 1.0 | 15.6 ± 2.2 |

What is claimed is:

1. A process for producing a polyacetal elastomer composite article from a molding made from polyacetal (component a)) with directly molded-on functional elements made from at least one thermoplastically processable elastomers (component b)), in which the components polyacetal and elastomer have differing hardness, wherein the material with the greater hardness (component a)) is initially pre-injected in a first step in a mold, and then is either cooled and removed from the mold and then placed into another, larger cavity, or is partially removed from the mold, but remains in a portion of the mold, and is then moved to a larger cavity, or, without removal from the mold, remains in the same mold, which is enlarged by means of a movable device, and in a second step, by overmolding with the material with the lesser hardness (component b)), the molding formed from component a) is firmly bonded to this material and is then removed from the mold as a composite article.

2. The process as claimed in claim 1, wherein the tensile strength of the bond between component a) and component b) is at least 0.5 N/mm$^2$.

3. The process as claimed in claim 1, wherein the melt temperature of component a) in the first step is from 180° C. to 240° C., preferably from 190 to 230° C., and the mold temperature is from 20° C. to 140° C.

4. The process as claimed in claim 1, wherein, before the overmolding with component b), the molding formed from component a) is either preheated in the range from 80° C. to preferably just below the melting point of component a) before being placed into the other mold or, in the same mold, is cooled only to an extent which still gives a hot premolding for further processing.

5. The process as claimed in claim 1, wherein in the second step during injection of component b) the melt temperature is in the range from 180° C. to 240° C. and the mold temperature is in the range from 20° C. to 100° C.

6. The process as claimed in claim 1, wherein component a) is a polyacetal homo- or copolymer with a melt index (MFR 190/2.16 in accordance with ISO 1133) of from 0.5 to 75 g/10 min.

7. The process as claimed in one or more of claims 1 to 6, in which a modified polyacetal is used as component a).

8. The process as claimed in claim 7, wherein component a) has been modified with a thermoplastic polyurethane elastomer, with a methyl methacrylate-butadiene-styrene core-shell elastomer, a methyl methacrylate-acrylate core-shell elastomer, with a polycarbonate, with a styrene-acrylonitrile copolymer or with an acrylate-styrene-acrylonitrile copolymer compound.

9. The process as claimed in claim 8, wherein component a) has been modified with from 1 to 50% by weight of a thermoplastic polyurethane elastomer, with from 1 to 40% by weight of a methyl methacrylate-butadiene-styrene core-shell elastomer or with a mixture of both, where the total of the proportions of both modifiers is the range from 1 to 50% by weight.

10. The process as claimed in claim 1, wherein component b) is composed of a thermoplastic polyurethane elastomer, built up from rigid urethane segments and flexible long-chain diol segments.

11. The process as claimed in claim 10, wherein the long-chain diol segments used are polyesterdiols or polyetherdiols.

12. The process as claimed in claim 1, wherein polyesterurethane elastomers or polyetherurethane elastomers are used 35 as component b) and have a hardness of from Shore A 65 to Shore D 75.

13. The process as claimed in claim 1, wherein component a) and component b) comprise conventional additives.

14. The process as claimed in claim 13, wherein the additives used are stabilizers, nucleating agents, mold-release agents, lubricants, fillers or reinforcing materials, pigments, carbon black, light stabilizers, flame retardants, antistats, plasticizers or optical brighteners.

* * * * *

UNITED STATES PATENT AND TRADEMARK OFFICE
CERTIFICATE OF CORRECTION

PATENT NO. : 6,296,797 B1
DATED : October 2, 2001
INVENTOR(S) : Ursula Ziegler, Klaus Kurz and Frank Reil It is certified that error appears in the above-identified patent and that said Letters Patent is hereby corrected as shown below:

Column 6,
Line 55, delete "Tmo" and insert -- $T_{mo}$ --.

Column 9,
Line 29, delete "MYR" and insert -- MVR --.

Column 17,
Lines 16-17, delete "one or more of claims 1 to 6" and insert -- claim 1 --.

Column 18,
Line 16, delete "35".

Signed and Sealed this

Eleventh Day of June, 2002

Attest:

Attesting Officer

JAMES E. ROGAN
*Director of the United States Patent and Trademark Office*